Feb. 20, 1940.   K. W. NEBEL   2,190,911
PORTABLE SHEAR
Filed July 12, 1937   2 Sheets-Sheet 2
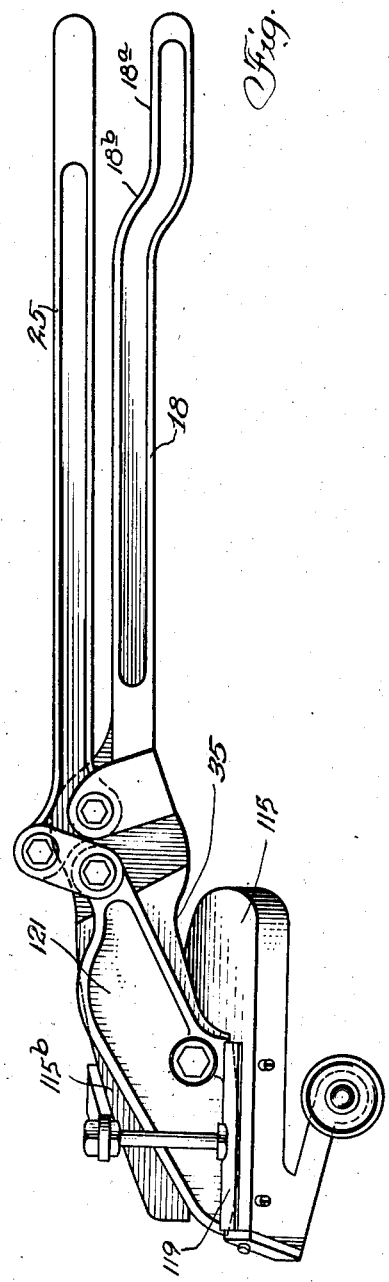
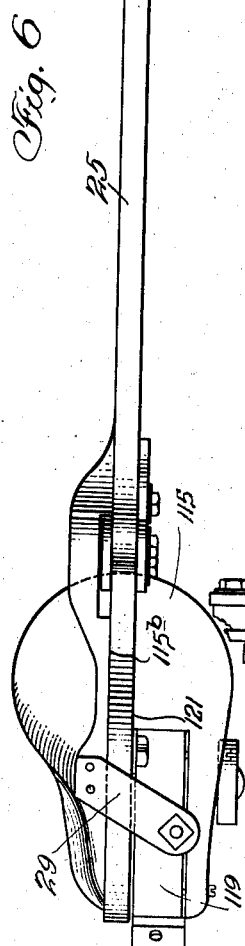
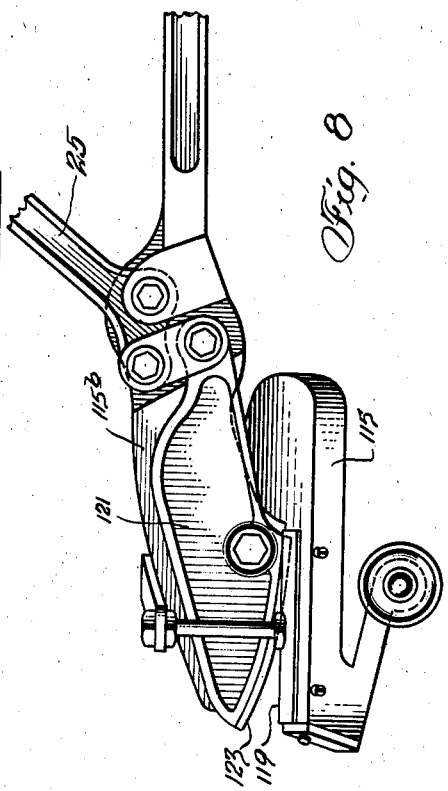
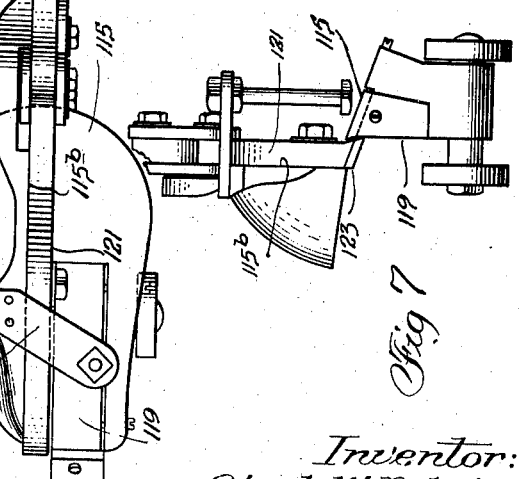
Inventor:
Kurt W. Nebel
By: Stevens Batcheler
Attys.

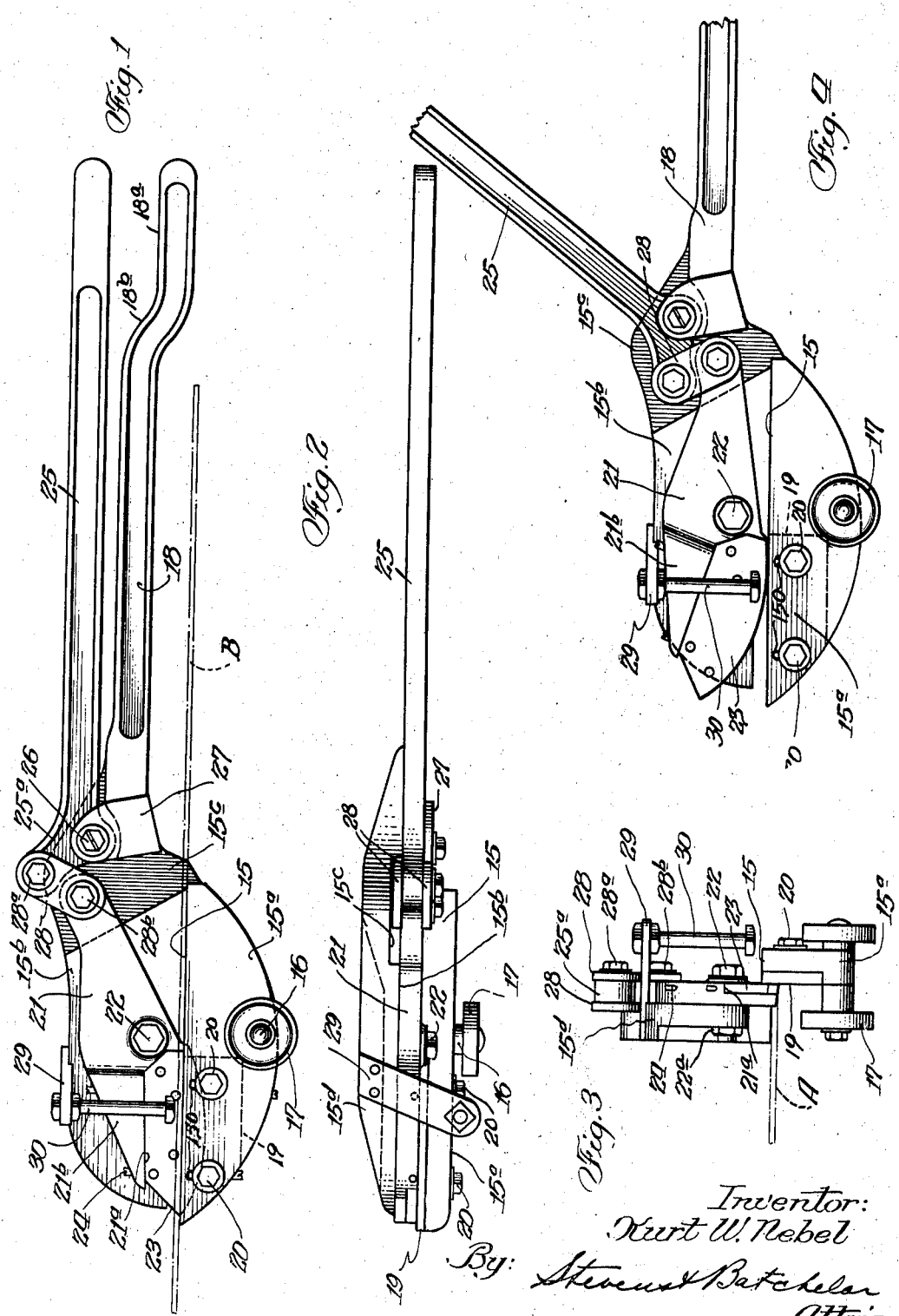

Patented Feb. 20, 1940

2,190,911

UNITED STATES PATENT OFFICE 2,190,911

PORTABLE SHEAR

Kurt W. Nebel, Chicago, Ill.

Application July 12, 1937, Serial No. 153,260

5 Claims. (Cl. 30—259)

My invention relates to hand shears employed in sheet metal shops and of a character to be portable over a floor or table, and my main object is to provide a shear of this type which provides a free and even course of progress for the sheet as it is being cut, eliminating the climbing and bending of the sheet usually involved in order to continue the shearing operation.

A further object of the invention is to devise a portable shear in which a bed receives the work, but does not form a direct junction or pivot with the shearing blade, as is the customary construction.

A still further object of the invention is to design the novel shear with a side element which forms a support for the mechanism and shearing blade.

Another object of the invention is to construct the novel shear with a combined bed, side support and stationary lever extending from the latter as an assembly by which the motive mechanism is supported and with which it co-operates.

An additional object of the invention is to provide a simple and sturdy operative connection between the shear control and blade which secures a highly favorable leverage for the operation of the shear.

A significant object of the invention is to build the same with blades which are so tilted as to allow clearance for the work as it is cut and thus reduce friction and the effort necessary to operate the shear.

An important object of the invention is to design the same with few parts which are very simple and rugged, whereby to render the shear inexpensive to manufacture and durable.

With the above objects in view, and any others which may suggest themselves from the description to follow, a better understanding of the invention may be had by reference to the accompanying drawings in which—

Figure 1 is a side elevation of the novel shear from the left in the position of completing a cut.

Fig. 2 is a top plan view of the same;

Fig. 3 is a front end view;

Fig. 4 is a view similar to Fig. 1, showing the shear opened or ready to receive the work, and Figs. 5 to 8 are duplications of Figs. 1 to 4 of a modified shear.

Hand shears of the type herein considered are necessarily of a heavier construction in order to handle sheet metal of various gauges, and are frequently made with a pair of wheels to be rolled over a floor or large work table as the cutting progresses. On the other hand, what shears have come to my attention still operate on the old principle of crossed blades, and it follows that the work climbing up on the handle or arm of the lower blade must in some manner be gotten out of the way in order that the shear may make its progress, this usually being done by curling or bending the metal which assumes the climbing movement. Obviously, sheet metal so curled or bent cannot be restored to the desirable flat shape, and whatever may be done in the shop to straighten or flatten the sheet is accepted as a satisfactory compromise, being rarely a restoration to the true plane or evenness of the metal sheet. It has therefore been my intention to overcome the deficiencies just described by the provision of a shear which not only operates more freely than any other of its type, but allows a full clearance for the sheet as it leaves the shearing zone, so that the same may remain in the original or flat form after the shearing operation.

In accordance with the foregoing, specific reference to the drawings indicates the basic portion of the novel shear in the form of a bed 15. At one side, the latter has a depending flange 15a which serves to raise the bed from the floor or other surface on which the shear is disposed and also carries an axle 16 crosswise, the end portions of the axle receiving a pair of traction wheels 17. The opposite side of the bed 15 is formed with an integral wall 15b, the same being extended rearwardly with a stationary lever 18. The extreme rear end of the stationary lever 18 is downwardly offset as at 18a to permit a substantially flat and stable engagement thereof with the floor or work table top. The shoulder 18b of the offset is engaged by the operator's foot to move the shear forward as the work is cut.

The flange 15a is extended forward from the bed 15 and receives a stationary blade 19 on the inner side. A pair of longitudinally spaced bolts 20 serves to secure the blade to the flange, and the latter is vertically slotted as indicated at 15c to permit the adjusting of the blade in the event of wear or displacement.

The wall 19 receives an arm 21 on its inner side, the arm being pivotally secured to the wall by a bolt 22 which receives a nut 22a on the outer side of the wall. The pivot 22 is at a medial point, and forwardly of the same the arm 21 is cut away on its inner side as indicated at 21a in order to accommodate the shearing blade 23. The same is of course positioned to assume a shearing relation with the stationary blade 19 when the arm 21 is swung in a counter-clockwise direction.

Also, the shearing blade 23 is supported from the head portion 21b of the arm 21 by screws 24 threaded in such head portion and adjustable to lower or raise the shearing blade. The surfaces against which the blades 19 and 23 are laid are not vertical, but depart slightly in outward direction from the meeting line of the blades. Thus, the inner faces of the blades do not frictionally receive the work sections issuing from the shearing zone, so that the incidental resistance is eliminated.

The operating lever of the shear is indicated at 25, and it is formed with a short forward bend 25a at the bottom. At the angle with the bend, the lever is pivoted on a pin 26 carried by a reduced section 15c of the wall 15b and an ear 27 projected from the inner side of the stationary lever 18. The forward terminus of the bend 25a is connected by means of a pair of links 28 to the rear end of the arm 21, suitable pins 28a and 28b forming the connectors for the links.

Since the sheet metal is taken into the shear upon the flange 15a and bed 15, I provide a bracket 29 with an adjustable hold-down bolt 30 over the zone in which the work is received, in order that the latter may not buckle or rise from the stress of the shearing operation. The bracket is attached on an outwardly extending enlargement 15d of the wall 15d, whereby to provide a wide seat for the bracket. The wall 15b extends forwardly of the pivot 22 for the arm 21 to provide a backing for the movable blade 23, thereby insuring a clean cut when heavy gauge material is being sheared.

To operate the shear the work is engaged and the operating lever 25 actuated in the customary manner. As the work is divided, the right-hand section—from the viewpoint of the operator—moves from the bottom of the shearing blade 23 directly along the under side of the bed 15, as is indicated by dotted lines at A in Fig. 3. At the same time, the left-hand section of the work moves over the bed flange 15a and its stationary blade 19 and continues to advance over the bed 15, as indicated by dotted lines at B. Thus, nothing impedes the advance of either work section, so that rapid progress may be made and the sheared sections remain in the flat state throughout the shearing operation, whatever the size of the sheet may be.

It will be appreciated that the highly-advantageous design of the shear is due principally to the fact that its bed is below and independent of the pivot of its blades. With the pivot elevated from the bed, the latter forms an even extension of the cutting edge of the lower blade and receives the work-section on its side at the natural level and with nothing to impede the progress of the section at such level, whatever the length of the cut may be. Also, a highly-favorable leverage is obtained for the operating lever 25 by linking its short heel 25a to the relatively-long arm 21, enabling sheet metal of heavy gauge to be cut without undue effort.

The modification of Figs. 5 to 8 is designed for the cutting of curves, scrolls or other irregular formations from the sheet metal stock. For this purpose the work must have leeway to be swung sidewise in one or the other direction, according to the course of the cut. The side wall 115b is therefore made with a deep throat 35 above the bed 115 to provide the necessary clearance, and the bed has a rising slant from the left-hand side (facing forwardly) toward the right, so that the work may climb out of the way as it is rotated. The rear edge of the bed is also rounded to conform with the rotation of the work. The arm 121 corresponds to the arm 21 of the preferred form and mounts a blade 123. The bed 115 mounts a blade 119.

It will be evident from the above description that I have provided a portable shear which can cut its way through the largest or longest piece of sheet metal without the slightest obstacle or difficulty. Yet, the novel shear is easily operated by hand and carried or rolled from place to place; and it is comprised of few and simple parts.

I claim:

1. A hand shear, comprising a stationary bottom blade, a lateral offset from said blade, said offset having an upwardly projecting extension, a movable blade pivotally attached to said extension in shearing relation to said stationary blade, and a hold-down unit projected from said extension over said movable blade and downwardly to a position alongside the remote side of the movable blade and over the course of the work.

2. A hand shear, comprising a stationary bottom blade, a lateral offset from said blade, said offset having an upwardly projecting extension, a movable blade pivotally attached to said extension in shearing relation to said stationary blade, a wide support at the top of said extension, a bracket secured thereon and extended to a position alongside the remote side of the movable blade, and a hold-down bolt, depending from the free end of the bracket to a point over the course of the work.

3. A hand shear comprising a stationary blade, an upwardly extending support on one end of said blade, a movable blade pivotally connected to the face of said support and extending alongside said stationary blade in shearing relation therewith, and a rigid backing for said movable blade in the cutting zone, said backing comprising an integral extension of said support and extending along the back of said movable blade for substantially its entire length a rearwardly projecting handle on said extension, said handle being formed to provide a pushing surface for engagement with an operator's foot for propelling said shear in a forwardly direction, a rearwardly projecting movable handle for said movable blade, and said pushing surface being formed to be spaced from said movable handle at all times to permit forward propulsion of said shear at any time during a cutting operation.

4. A hand shear, comprising a stationary bottom blade, a laterally offset, upwardly projecting extension of said bottom blade, a movable blade pivotally attached to said extension in shearing relation to said stationary blade, a wide support at the top of said extension, a bracket secured thereon and extended to a position alongside the remote side of said movable blade, and a hold-down extended downwardly from the free end of said bracket along said remote side of said movable blade to a point over the course of the work.

5. The structure of claim 4 and said hold-down being adjustable towards and away from said work.

KURT W. NEBEL.